United States Patent [19]

Paterek et al.

[11] Patent Number: 5,727,313
[45] Date of Patent: Mar. 17, 1998

[54] METHOD OF MANUFACTURING LID COVERS FOR CONTAINERS AND PRODUCT

[75] Inventors: F. Dieter Paterek; Donald H. Hall, both of Hamilton County, Ohio

[73] Assignee: Emerson Electric Co., St. Louis, Mo.

[21] Appl. No.: 731,859

[22] Filed: Oct. 21, 1996

Related U.S. Application Data

[60] Division of Ser. No. 970,273, Nov. 2, 1992, abandoned, which is a continuation-in-part of Ser. No. 881,068, May 11, 1992, Pat. No. 5,279,907.

[51] Int. Cl.$^6$ ................................................. H01R 43/02
[52] U.S. Cl. .......................... 29/877; 29/527.4; 437/221
[58] Field of Search ........................... 29/877, 825, 827, 29/527.9, 527.4; 437/221; 204/206, 213

[56] References Cited

U.S. PATENT DOCUMENTS

| | | |
|---|---|---|
| 3,404,213 | 10/1968 | Brookover et al. ............... 437/221 X |
| 4,103,416 | 8/1978 | Sakomoto . |
| 4,115,629 | 9/1978 | Dey et al. . |
| 4,284,481 | 8/1981 | Hascoe . |
| 5,017,740 | 5/1991 | Honkomp et al. . |
| 5,279,907 | 1/1994 | Paterek et al. . |

FOREIGN PATENT DOCUMENTS

| | | | |
|---|---|---|---|
| 57-96555 | 6/1982 | Japan | 437/221 |
| 58-54656 | 3/1983 | Japan | 437/221 |

*Primary Examiner*—Carl J. Arbes
*Attorney, Agent, or Firm*—Polster, Lieder, Woodruff & Lucchesi

[57] ABSTRACT

A method for, and product of manufacturing vessel lid covers including electrically conductive pin assemblies for vessel container housings including pre-plating both the lid covers and pins in a first area and forming the pre-plated lid covers with their pin assemblies in a second area with selected portions of the lid covers being freed of plating during the process to enhance pin assembly fusing and the product formed.

9 Claims, 2 Drawing Sheets

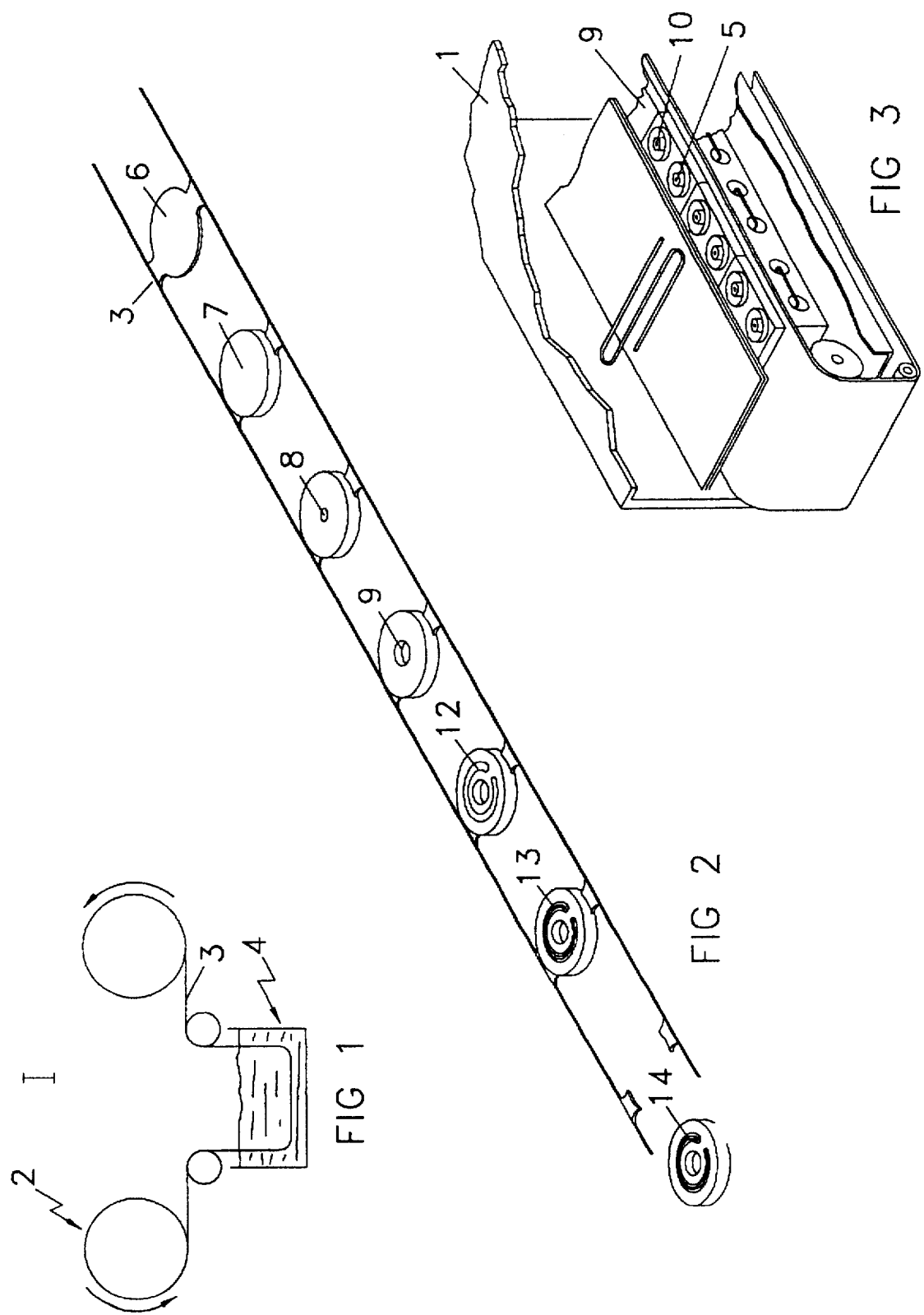

METHOD OF MANUFACTURING LID COVERS FOR CONTAINERS AND PRODUCT

This is a divisional of application Ser. No. 07/970,273, filed on Nov. 2, 1992, now abandoned, which is a continuation-in-part of Ser. No. 07/881,068, filed May 11, 1992, now U.S. Pat. No. 5,279,907.

BACKGROUND OF THE INVENTION

The present invention related to lid covers including electronically conductive pin and terminal cover assemblies for housing container devices of various sizes and for various uses such as for the small hermetic terminal assemblies associated with lithium type batteries and for the much larger hermetic terminal assemblies which are usually hermetically sealed to house compressors. More particularly, the present invention provides for a unique and novel method of making such lid covers including the plating thereof and for a unique lid cover product.

It generally is well known to provide lid covers which include fused electrically conductive pin assemblies with the covers and conductive pins having been plated in order to reduce the possibilities of corrosion through oxidation and rusting. Both the lid covers and pins generally have been of metallic nature, such as a suitably selected-stainless steel and both the lid covers and pins have been plated with an appropriately selected corrosion preventive metal, such as nickel or, a substantially nickel alloy metal, the plating being accomplished after lid cover formation and pin assembly. Because of the irregular contours of the assembled covers and pins and the desire to obtain uniformity of plating thickness and good heat shock resistance of the assembled lid covers, an electroless, chemical reduction process has been employed in the past, which process, once initiated, has been autocatalytic without the use of outside current—the metal portions of the entire assembly being plated in one operation.

The present invention recognizes that this past practice of post plating after lid cover and pin assembly sealing, despite the accompanying positive features of lid cover plating uniformity and heat shock resistance has presented several undesirable problems both as to the finished product and as to the environmental waste disposal involved upon process completion. Not withstanding the uniformity of thickness of the post-plated lid cover, it has been recognized that the post-plating on the periphery of the pins has not always been uniform with possible microscopic cracks occurring in the post-plating of both pins and lid covers and with sometimes, consequent "ball batting", and with less consistency in resistance and conductive possibly occurring with the post-plating of the pins. Further, environmental problems as to waste disposal have arisen as a consequence of the "on-site" post-plating of lid covers and pins, particularly with the practice of an electroless plating process with the concomitant chemical formation of undesirable chelates, which are particularly difficult to treat before disposal.

The present invention, recognizing these existing problems in the often past used "on-site" electroless post-plating process—as well as being aware of the use of the more recently employed electrolytic pre-plating processes for industrial metallic parts in unrelated arts, recognizes both the feasibility and unique desirability of utilizing an "off-site" more environmentally friendly electrolytic pre-plating process in the present art of plating both lid covers and electrically conductive pins. Moreover, the present invention recognizes that some of the problems previously considered to be inherent to pre-plating processes generally are not as material as initially believed, since certain critical problem areas involving pre-plated material now have been recognized to be substantially eliminated during lid cover formation in the present invention so as not to inhibit subsequent fusion during pin assembly operations. Furthermore, the present invention recognizes that certain unplated and exposed area occurrences in pre-plating such as at the base portions of lid covers and at the end extremities of conductive pins—have not been detrimental to the function of assembled pre-plated parts of the present art. In addition, in accordance with the present invention, a straightforward and economical process and product is provided involving a minimum of steps and a minimum of parts respectively. Further, by pre-plating at an "off-site" basis with a more environmentally friendly electrolytic process, as distinguished from the previously utilized "on-site" electroless process, it is possible to handle large volumes of parts at only one concentrated industrial area in an environmentally selected, waste receptive locale and, at the same time, insure proper plating thickness control and appropriate resistance to heat shock. Moreover, undesirable conductivity problems from pin plate "ball batting" are substantially avoided by the inventive process, as are the problems of possible chemical contamination within the possible micro cracks and bubbles near the surface of the fusing material which problems have arisen on occasion during the past post-plating electroless process, these possible problems of the past post-plating processes, leading to possible premature subsequent electrical failures. Furthermore, the resulting product of the present is aesthetically more attractive, with the pre-plated pins and lid covers being assuringly bright and shiny when passed through the several steps of the inventive process.

Various other features of the present invention will become obvious to one skilled in the art upon reading the disclosure setforth herein.

BRIEF SUMMARY OF THE PRESENT INVENTION

More particularly the present invention provides a novel method of manufacturing vessel lid covers including conductive pin assemblies for vessel container housings comprising: uniformly pre-plating an elongated metallic strip of material of preselected width substantially in its entirety with a preselected plating material in a first zone prior to vessel lid cover formation to provide pre-plated strip stock of uniform plated thickness for the vessel lid covers formation; feeding the pre-plated strip stock in a continuously moving strip in a second zone to stamp lid cover blanks in spaced relation on the pre-plated moving strip of preselected size and configuration; shaping each of the stamped pre-plated lid blanks in a third zone to provide a uniform pre-plated thickness vessel container lid cover to fit a vessel container; piercing and shaping each of the pre-plated vessel container lid covers in a fourth zone to provide a shaped walled aperture therein for a conductive pin assembly with the pre-plating on the inner face of the aperture wall being substantially removed by the piercing and shaping step; separating each pre-plated shaped vessel lid cover in a fifth zone; inserting a conductive pin assembly including a conductive pin and surrounding fusible insulating material in the shaped wall aperture of each shaped vessel lid cover; and, fusing the assembled lid cover to fuse the fusible insulative material to the peripheral wall of the pin and the inner face of the aperture wall where the plating has been substantially removed so as to enhance the fusing step. In addition, the present invention provides for the forming of the conductive pin of the pin assembly from an extended metallic wire rod pre-plated in a separate zone and cut to a preselected length from the pre-plated rod. Further, the present invention can include the additional steps of punching each of the pre-plated lid covers at a preselected spaced position from the walled aperture prior to the separating step to provide a pressure relief safety vent opening; and, fastening a profoundly repturable, inelastic foil membrane in covering and timely sealing relation with respect to the vent opening in each of the plated vessel lid covers. Finally, the present invention provides a novel terminal assembly cover for a vessel container housing comprising: a uniform partially pre-plated cup-shaped metallic lid cover having a shaped walled aperture therein with the inner surface of the walled aperture being substantially free of pre-plating material; and, a pin assembly including a conductive pin with the peripheral wall substantially pre-plated the entirety of its length and surrounding fusible material fused to the substantially pre-plate free, inner surface of the walled aperture and the peripheral surface of the pre-plated conductive pre-plated pin.

It is to be understood that various changes can be made by one skilled in the art in one or more steps of the inventive method and in one or more parts of the inventive product as described herein without departing from the scope or spirit of the present invention.

BRIEF DESCRIPTION OF THE DRAWINGS

Referring to the drawings, which disclose two advantageous embodiments of the present invention:

FIG. 1 is a schematic representation of a pre-plating operation, the Roman numeral I indicating a first area or site in carrying out the first step of the inventive method of the present inventive method;

FIG. 2 is a schematic representation of the several steps of the forming operation of the lid covers, the Roman numeral II indicating a second area or site in carrying out the remaining forming and fusing steps-of the present inventive method;

FIG. 3 is a schematic representation of loaded jig support trays passing through a fusing heat oven in accordance with the present invention;

DETAILED DESCRIPTION OF THE DRAWINGS

Figure 4:
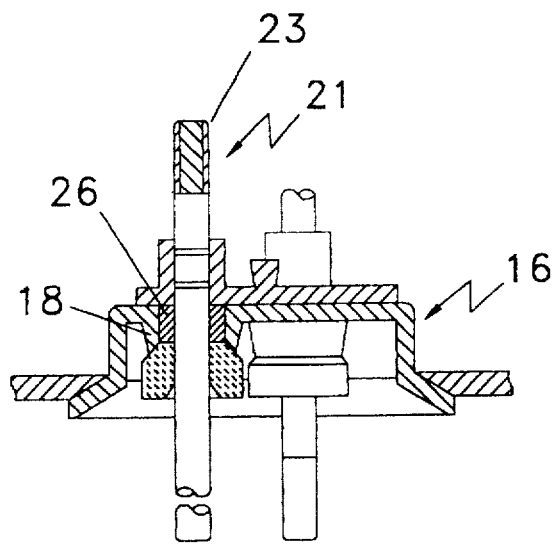
FIG. 4 discloses one type of vessel lid cover including a conductive pre-plated pin assembly made in accordance with several of the steps of the inventive method of FIGS. 1–3 and incorporating the inventive product features therein; and, FIG. 5 discloses still another type of vessel lid cover including a conductive pre-plated pin assembly made in accordance with all of the disclosed inventive steps of FIGS. 1–3.

Referring to FIGS. 1–3 of the drawings, the Roman numerals I, and II, are disclosed as indicating two areas or sites utilized in carrying out the present invention, site or area designated by Roman numeral I comprising the first area to carry out the first zone pre-plating step of the inventive method. A suitable roll 2 of alloyed steel, advantageously having a rating of approximately one quarter hardness or greater and a thickness in the range of 0.008 to 0.06 inches and advantageously having a thickness of approximately 0.010 inches plus or minus 0.002 inches can ben used to form a lid cover strip 3. It is to be understood that the present invention is not to be considered as limited to the specific metal or metallic alloy and thickness aforedescribed but that other metals or metal alloys and other metal thicknesses can be employed, depending upon the destined use of the lid covers and the environment involved. In like fashion, the breadth of strip 3 can vary in accordance with the processing machinery utilized and the finalizing of the lid covers. Advantageously, strip 3 is run continuously through an electrolytic plating tank 4. Details of the electrolytic plating process are not disclosed, since any one of a number of electrolytic plating processes can be utilized, it being sufficient to mention that an outside current is employed between an anode and cathode in an appropriately selected chemical bath with the materials and currents involved depending upon the chemical nature and thickness of the pre-plating to be achieved. Advantageously, lid cover strip 3, which is of a steel alloy as abovedescribed can be plated with nickel so that the final pre-plated product comprises about ninety percent (90%) nickel (NI) and ten percent (10%) iron (Fe) with a minimum and uniform pre-plate thickness of at least 0.0015 inches. It is to be noted that an electrolytic pre-plating process is utilized at a site or area removed from the site or area of the hereinafter described forming and heating process and preferably at a central site where environmental waste materials from the process can be acceptably disposed. In this regard, it is to be further noted that such a pre-plating process also is compatible to the obtaining of pre-plated lid covers which are of uniform pre-plated thickness with a minimum of possible micro-cracks and bubbles and with a maximum of heat shock resistance. It also is to be understood that other types of pre-plating processes and alloys can be used, even including an electroless process as above noted, so long as the resulting undesirable chelates can be appropriately treated and disposed of in an environmentally acceptable manner. Finally, it is to be understood that the aforedescribed pre-plating step of cover strip 3 performed at the area or site I cab be performed not only on roll 2 of alloyed steel in accordance with the present invention, but that it also is within the purview of the present invention to similarly pre-plate a coil of stainless steel or copper clad rod at site I to be subsequently cut to a pre-selected size to form pre-plated electrically conductive lid cover pins.

Referring to FIGS. 2 and 3 of the drawings which schematically disclose the formation and oven heating steps of the novel method at an area or site II remote from he pre-plating step at area or site I (FIG. 1), it is to be noted that some of the steps herein described in combination are similar, in many ways, to those described in co-pending application Ser. No. 07/881,068, filed May 11, 1992 by F. Dieter Paterek and in U.S. Pat. No. 5,017,740, issued on May 21, 1991, to Glen A. Honkomp, et al. As can be seen in FIG. 2, the pre-plated strip stock 3 is fed as a continuously moving strip in area II to stamp in spaced relation thereon in a second zone uniformly pre-plated lid cover blanks 6, the blanks being suitably sized and shaped in accordance with the vessel container with which they are to be used. Each of the stamped, pre-plated blanks 6, is then shaped in a third zone of the second area II to provide a uniform thickness pre-plated vessel container lid cover 7. Pre-plated cover 7 is then moved to a fourth zone of area II to be pierced, providing an aperture 8 therein which aperture is subsequently expanded and shaped to provide a walled aperture 9. It is to be understood that the aperture piercing and the wall shaping steps can be accomplished in one step in the fourth zone or in two separate steps in two zones depending upon the size and geometry of the aperture to be formed. In this regard, it is essential that during the piercing and wall forming steps, whether it be one combined step or two separate steps, that the inner face of the wall be substantially freed of nickel plate.

In one embodiment of the present invention, particularly in those instances where the pre-plated vessel covers are destined for use as hermetic terminal assemblies for vessel containers such as hermetically sealed housings for compressors and thus are of larger size, the pre-plated shaped and wall apertured lid covers are separated in a fifth zone. Suitable nickel plated pins 5 cut to appropriate size in a sixth zone (not shown) from a nickel plated rod coil, which also was electrolytically pre-plated like lid cover strip 3 in the area or site I, are then assembled in a seventh zone with the several nickel plated lid covers in a jig support tray 9 (FIG. 3). A preselected annular, fusible insulating material, advantageously glass in bead form 10 (see glass seals 26 and 27 of FIGS. 4 and 5 respectively) is inserted into the shaped wall aperture with the outer periphery of each bead adjacent the inner face of the walled .aperture which wall is substantially free of nickel plating. The inner peripheral wall of the annular bead when assembled abuts adjacent the peripheral wall of the assembled nickel plated pin (see FIGS. 4 and 5). Once the jig support tray 9 has been filled with assembled pre-plated lid covers and their conductive pins with the fusible annular beads therebetween, the loaded jig support tray 9 is then inserted into a heat oven 11 to soften the glass annular beads and fuse the same to the peripheral walls of the pre-plated pins and the inner faces of the aperture walls 8 of the pre-plated lid covers which are free of nickel along the wall inner face so as to enhance fusing.

In accordance with still another embodiment of the invention and again referring to FIG. 2 of the drawings, the method as abovedescribed can include the further steps after the piercing step in the fourth zone of coining a groove 12 of pre-selected V-shape depth in spaced surrounding horse-shoe shape to each conductive pin assembly receiving walled aperture 8 in pre-plated lid covers 6 with the opposed extremities of the horse-shoe shape being preselectively spaced form each. Each groove 12 is then punched to provide a horse-shoe safety vent opening 13 to receive a thin, inelastic, profoundly rupturable nickel alloyed brazing strip 14 in covering relation with the vent opening 13 during jig support tray operations and prior to heat oven insertion (FIG. 3). During the appropriately selected residence time of the filled jig support tray in the heat oven 11, the strips 14 are brazed along the vent opening 13 perimeters as theinsulative glass is fused to the pre-plated lid covers and pre-plated pins as aforedescribed, the three fusing operations of glass to pre-plated lid cover and conductive pin and strip to opening being accomplished in the same oven heating step.

Figure 5:
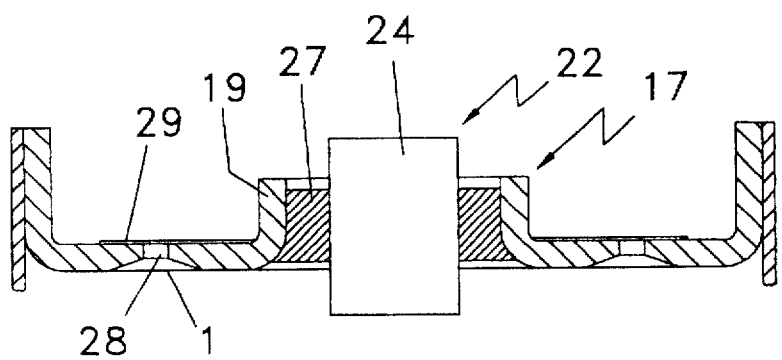

Referring to FIGS. 4 and 5, two inventive product embodiments of the present invention are disclosed, FIG. 4 disclosing a pre-plated vessel lid cover in accordance with the present invention particularly adaptable for use with a hermetically sealed compressor housing and FIG. 5 disclosing a pre-plated vessel lid cover in accordance with the present invention, particularly adaptable for use as a smaller, safety vented hermetically sealed lithium battery terminal assembly. In each of the disclosed novel vessel lid covers 16 and 17, there is disclosed a uniformly partially pre-plated lid cover, which pre-plating advantageously can be of nickel or nickel alloy material. Each pre-plated lid cover 16 and 17 includes a shaped walled aperture 18 and 19 respectively therein with the inner surface of each of the walled apertures 18 and 19 each being substantially freed of pre-plating material. A pin assembly 21 and 22, respectively, is provided for each pre-plated lid cover 16 and 17. Each pin assembly 21 and 22 includes a pre-plated pin 23 and 24 respectively surrounded by an annular fusible glass seal 26 and 27 respectively, the glass seal for each pre-plated lid cover 16 and 17 being fused to the plate free inner surface of the respective shaped walled apertures 18 and 19, and the peripheral surface of the respective pre-plated pin 23 and 24 to provide the novel pre-plated terminal cups of FIGS. 4 and 5. It is to be understood, that the other features of the terminal assembly of FIG. 4 are like those of U.S. Pat. No. 5,017,740 issued to Glenn A. Honkomp, et al on May 21, 1991 and not described herein. As to the additional features of the smaller terminal assembly of FIG. 5, there is included an abovedescribed horse-shoe shaped vent opening 28 and a thin, elastic, profoundly rupturable horse-shoe shaped or annular shaped seal 29—all in accordance with abovedescribed copending patent application Ser. No. 07/881,068 of which this application is a continuation-in-part. In accordance with another feature of the present inventive product, the seal is specifically preselected to be fastened in sealing relation to the safety vent opening during the fusing of the annular fusible material of the pin assembly to the pre-plate free inner surface of pre-plated lid cover and the peripheral wall of the pre-plated pin of the pin assembly.

Thus, in accordance with the present invention an economical, straightforward, environmentally compatible method and a product is provided involving a minimum of steps and a minimum of parts.

The invention claimed is:

1. A method of manufacturing vessel lid covers including conductive pin assemblies for vessel container housings comprising: uniformly pre-plating an elongated metallic strip of material of preselected width substantially in its entirety with a preselected plating material in a first zone prior to vessel lid cover formation to provide pre-plated strip stock of uniform plated thickness for said vessel lid covers formation;

feeding said pre-plated strip stock in a continuously moving strip in a second zone to stamp lid cover blanks in spaced relation on said pre-plated moving strip of preselected size and configuration;

shaping each of said stamped pre-plated lid blanks in a third zone to provide a uniform thickness vessel container lid cover to fit a vessel container;

piercing and shaping each of said pre-plated vessel container lid covers in a fourth zone to provide a shaped walled aperture therein for a conductive pin assembly with the pre-plating on the inner face of said walled aperture being substantially removed by said piercing and shaping step;

separating each shaped vessel lid cover in a fifth zone;

inserting a conductive pin assembly including a conductive pin and surrounding fusible insulating material in the shaped walled aperture of each shaped vessel lid cover; and, fusing the assembled lid cover to fuse the fusible insulative material to the peripheral wall of the pin and the inner face of said walled aperture where the plating has been substantially removed to enhance the fusing step.

2. The method of manufacturing vessel lid covers of claim 1, said fusible material being a preselected fusible glass, said fusing being accomplished by heating the cover and pin assembly in an oven to the softening state of said glass.

3. The method of manufacturing vessel lid covers of claim 1, said pin for said conductive pin assembly being formed from an extended metallic wire rod pre-plated in a separate zone and cut to a preselected pre-plated pin length from said pre-plated wire rod.

4. The method of manufacturing vessel lid covers of claim 1 said metallic strip being of a preselected steel alloy and said preselected pre-plating material being a preselected nickel.

5. The method of manufacturing vessel lid covers of claim 1, including the further steps of punching each of said pre-plated vessel container lid covers at a preselected spaced position from said conductive pin assembly walled aperture prior to said separating step to provide a pressure relief safety vent opening; and, fastening a profoundly rupturable, inelastic foil membrane in covering and sealing relation with respect to said vent opening in each of said vessel lid covers.

6. The method of manufacturing vessel lid covers of claim 5, said foil membrane being of fusible material to be fused in sealed relation with said vent opening.

7. The method of manufacturing vessel lid covers of claim 6, said foil membrane being sealed to said vent opening in the same step that said fusible insulative material is fused to said conductive pin assembly and said walled aperture.

8. A method of manufacturing vessel lid covers including conductive pin assemblies for vessel container housings comprising:

uniformly electrolytically pre-plating both an elongated stainless steel alloy metallic strip of preselected width and an elongated steel alloy rod with preselected nickel in a remote first zone first area to provide nickel plated strip stock and nickel plated rod stock, both of preselected size and configuration;

feeding said pre-plated nickel plated strip stock in a continuously moving strip in a second zone, second area to stamp nickel plated lid cover blanks in spaced relation on said nickel plated moving strip;

shaping each of said stamped nickel plated lid blanks in a third zone second area to provide a uniform thickness nickel plated vessel container lid cover to fit a vessel container;

piercing and shaping each of said preselected nickel plated vessel container lid covers in a fourth zone, second area to provide a shaped wall aperture therein for a conductive pin assembly with the inner face of said wall being substantially free of nickel plating by said piercing step;

separating each shaped nickel plated vessel lid cover in a fifth zone second area;

cutting said nickel plated rod into nickel plated pins of preselected length in a sixth zone, second area;

mounting each shaped nickel plated vessel lid cover unto a jig support tray and inserting a conductive pin assembly including a conductive nickel plated pin and a surrounding preselected annular fusible insulating glass bead into the shaped wall aperture with the outer periphery of each bead abuttingly adjacent the inner face of the walled aperture substantially free of nickel plating and the inner peripheral wall of said annular bead abuttingly adjacent the peripheral wall of said nickel plated pin in a seventh zone, second area; and, inserting said jig support tray into a heated oven eighth zone, second area to soften the glass and fuse the same to the peripheral wall of said pin and the inner face of the apertured wall freed of nickel plating so as to enhance fusing.

9. The method of manufacturing vessel lid covers of claim 8, including the further steps after said piercing step in said fourth zone of coining a groove of preselected V-shape depth in said pre-plated lid cover in spaced surrounding horse-shoe shape to each conductive pin assembly receiving aperture with the opposed extremities of each of said horse-shoe shaped grooves being preselectively spaced from each other;

punching a horse-shoe shaped safety vent opening through each of said grooves after said coining step; and, inserting a horse-shoe shaped nickel allowed brazing strip in covering relation with each of said vent openings during said jig support tray assembly operations and prior to inserting said tray into said heated oven to braze the strips along the perimeter of said openings along with the softening and fusing of said insulative glass to said plating free inner face of said apertured wall and to said pin.

\* \* \* \* \*

UNITED STATES PATENT AND TRADEMARK OFFICE
CERTIFICATE OF CORRECTION

PATENT NO : 5,727,313
DATED : March 17, 1998
INVENTOR(S) : F. Dieter Paterek et al.

It is certified that error appears in the above-identified patent and that said Letters Patent are hereby corrected as shown below:

Col. 4, line 37
 replace "cab"
 with --can--.

Col. 4, line 45
 replace "he"
 with --the--.

Col. 8, line 34
 replace "allowed"
 with --alloyed--.

Signed and Sealed this

Second Day of June, 1998

Attest:

BRUCE LEHMAN

Attesting Officer

Commissioner of Patents and Trademarks